United States Patent [19]

Slovinsky et al.

[11] 3,915,920
[45] Oct. 28, 1975

[54] STABILIZED WATER-IN-OIL EMULSIONS UTILIZING MINOR AMOUNTS OF OIL-SOLUBLE POLYMERS

[75] Inventors: Manuel Slovinsky, Woodridge; Roger C. Ryan, Chicago; Kenneth G. Phillips, River Forest, all of Ill.

[73] Assignee: Nalco Chemical Company, Oak Brook, Ill.

[22] Filed: Mar. 15, 1974

[21] Appl. No.: 452,083

[52] U.S. Cl............. 260/29.6 RW; 260/29.6 RW; 260/29.6 WQ; 260/34.2; 260/887; 260/896; 260/901
[51] Int. Cl.$^2$. C08L 33/26; C08L 33/02; C08J 3/08
[58] Field of Search.......... 260/29.6 RW, 29.6 RB, 260/29.6 WB, 34.2, 887, 896, 901

[56] References Cited
UNITED STATES PATENTS

| | | | |
|---|---|---|---|
| 3,624,019 | 11/1971 | Anderson et al. | 260/29.6 B |
| 3,661,835 | 5/1972 | Baker et al. | 260/34.2 |
| 3,779,977 | 12/1973 | Hicks | 260/34.2 |
| 3,793,245 | 2/1974 | Clarke et al. | 260/34.2 |
| 3,812,075 | 5/1974 | Burdette et al. | 260/34.2 |

OTHER PUBLICATIONS

Noll–Chemistry and Technology of Silicones, Academic Press, N.Y.(1968), p. 193.

*Primary Examiner*—H. S. Cockeram
*Attorney, Agent, or Firm*—John G. Premo; John S. Roberts

[57] ABSTRACT

An additive and method of stabilizing and decreasing sediment in a water-in-oil emulsion where the aqueous discontinuous phase contains a water-soluble vinyl addition polymer, comprising an oil-soluble polymer added to the continuous phase in the amount of about 0.1–1% by weight based on the total polymer emulsion. Preferred water-in-oil emulsions include those containing polyacrylamide, polyacrylic acid predominantly in salt form, and copolymers thereof; and preferred oil-soluble polymers include polyisobutylene, polybutadiene, Betaprene H, poly(t)-butylstyrene, and natural rubber. The additive and method are useful for redispersing such emulsions.

2 Claims, No Drawings

STABILIZED WATER-IN-OIL EMULSIONS UTILIZING MINOR AMOUNTS OF OIL-SOLUBLE POLYMERS

A recent development in water-soluble polymer chemistry has been the appearance of water-soluble vinyl addition polymers which are dispersed as a water-in-oil emulsion which may be then conveniently packaged and inverting these emulsions in water for use. This technology is encompassed in U.S. Pat. No. 3,624,019 Anderson et al. (Nalco) and the polymerization of the monomers in a water-in-oil polymerization method for the same type polymers is set out in U.S. Pat. No. 3,284,393 Vanderhoff (Dow), and these two patents are hereby incorporated by reference for the specific reasons set out.

Of particular applicability in water treatment are water-soluble polymers formed from acrylamide or acrylic acid and salts thereof which are either homopolymers or copolymers. Specific examples of acrylic polymers which are preferred for this invention are homopolymers of acrylamide; a copolymer of acrylamide and 7% methacrylic or acrylic acid; a copolymer of acrylamide and 30% acrylic acid; and homopolymers of acrylic acid; all the acids being predominantly in the salt form.

The word salt where used in this specification is intended to include preferably alkali metal, ammonium, and amine salts such as, for example, the sodium and potassium salts.

Where the terms acrylic and polyacrylic acid are used in this specification they are intended to include both the free acid and the salts noted above.

The term polyacrylate likewise denoted predominantly the preferred salts as above and a preferred variety is where alternating treatment by base and then acid produces an acrylate which is predominantly in a salt form but contains a minority of free acid groups in the polymer structure.

In the packaging or shelf life, particularly of the polyacrylamides in water-in-oil emulsions and in containers, it has been found that a certain amount of sediment is produced on standing and it is a function of this invention to provide a method and compositions for decreasing this sediment and making it more easily dispersed. Additionally, the additives have been found to decrease the time necessary for redispersing original polymers constituting and packaging the water-in-oil emulsion.

THE OIL-SOLUBLE POLYMERIC DISPERSANTS

The present additives which are added to the oil phase of the invert emulsion are oil-soluble polymers which function to hinder the settling of the polymer which is dispersed in the water phase so that it does not settle out rapidly in a container. For this purpose certain specific oil-soluble polymers have been found to stabilize the emulsion and to give decreased settling propensities and decreased sediment. Among the preferred polymers are the polyisobutylenes, polybutadiene, Betaprene H, poly(t)butylstyrene, and natural rubbers. Polymers which are unsuitable for the present invention include polyethylene and polypropylene which do not function in this milieu due to insufficient solubility.

The polymeric oil-soluble additive may be introduced into the system at any time but preferably just after the formation of the basic water-in-oil emulsion polymer.

It has been further found that with polyisobutylene, the materials may be utilized in aromatic solvents or aliphatic type solvents such as a high purity isoparaffin and that the molecular weight of the oil-soluble polymer may be selected, as for isobutylenes, from molecular weights of 5 million, 1.3 million, and down to molecular weight of 380,000. However, the higher molecular weight polyisobutylenes are more effective and a minimum of 1 million molecular weight is preferred. It is apparent that some efficiency as a stabilizer or dispersant is sacrificed in favor of increased rate of solubilization as the molecular weight is lowered and specially below the preferred 1 million molecular weight. The molecular weight carryover has also been extended to other suitable oil-soluble polymers in that an operable range of about 300,000 to 6 million has been observed.

Of particular adaptability to this process has been the utilization of 0.3% polyisobutylene of molecular weight of 5 million utilized here as a 3% solution. The basic polymer is conveniently available commercially under the trade designation Oppanol B-200 (BASF), molecular weight 5 million, and utilized in Espesol (Exxon), an aromatic hydrocarbon solvent. Additionally, the Oppanol B-100, molecular weight 1.3 million, and Oppanol B-50, molecular weight 380,000, may be utilized where the faster solubilization of the lower molecular weight polymers is required or desired.

The dispersion or solution of the oil-soluble polymer may be effected in any suitable hydrocarbon solvent. Of particular utility are Espesol, an aromatic solvent, and Isopar-M, an aliphatic solvent which is a highly purified isoparaffin hydrocarbon product, both products of Exxon. The selection of the solvent is not critical with the exception that it perform adequately the function denoted.

Explanation of the favorable effects of adding oil-soluble polymers to the inverse emulsion systems of the present invention lies along two lines of thought. First, by the addition of polymers to the continuous phase (oil), sediment is slower to form on the bottom of the container. Secondly, apparently there is an effect on the particle-to-particle interaction in that sediment on the bottom is easier to redisperse, which fact may be in some manner associated with the change of viscosity of the continuous oil phase.

DOSAGE

The dosage of the oil-soluble polymer added to the continuous phase may be in the amount of 0.1–1% by weight based on the total water-in-oil polymer emulsion and preferably in the amount of 0.3–.75% by weight on the same basis. The most important parameter is the lower value for the range since this value determines the least amount of additive necessary to stabilize and redisperse the basic water-in-oil emulsion.

EXAMPLE 1

Experimental Procedure

The following testing protocol was designed to compare the results of four polyacrylamide and/or polyacrylate water-in-oil emulsions which had been prepared according to the procedure of U.S. Pat. No. 3,624,019—Anderson (ante) and to which certain oil-soluble additives were added and measuring the effect on emulsion stability.

The test procedure consisted of centrifuging 50g of the experimental emulsion and an untreated control at high speed for ten minutes, then inverting the centrifuge tube for one minute to measure the amount of emulsion to flow from the tube in that period. This amount of flow was then expressed as a percentage of the original 50g present. The test by centrifuge gave consistent results; that is, a given control or experimental sample would give the same percent to flow numbers repeatedly in the same type of centrifuge tubes.

In the following Tables 1–6, results are expressed for the addition of the oil-soluble polymer polyisobutylene (Oppanol B–) in several molecular weights with four polymer emulsions selected from polyacrylamides, poly- acrylamides/acrylates, and homopolyacrylates and salts thereof, and additionally in an aromatic hydrocarbon solvent (Espesol) and an aliphatic hydrocarbon solvent (Isopar-M).

Table 7 shows additional test results involving separate polymers; namely, poly(t)butylstyrene (TBS), natural rubber latex (NRL), and betaprene H—100 Reichhold, showing the increase in flow level wherein the weight percent of oil-soluble polymer in the emulsion rises to the level of 0.24–0.48.

Definitions relative to Tables 1–6:
Polymer A is a homopolymer of sodium acrylate.
Polymer B is a copolymer of acrylamide and 30% acrylic acid sodium salt.
Polymer C is a homopolymer of acrylamide.
Polymer D is a copolymer of acrylamide and 7% methacrylic or acrylic acid sodium salt.

Polymers A–D are high molecular weight and water-soluble polymers of molecular weight 1 million to 7 million.

Oppanol B-200 (BASF) is a polyisobutylene with a molecular weight of 5 million.

Oppanol B-100 (BASF) is a polyisobutylene with a molecular weight of 1.3 million.

Oppanol B-50 (BASF) is a polyisobutylene with a molecular weight of 380,000.

Espesol (Exxon) is an aromatic hydrocarbon solvent.

Isopar M (Exxon) is a high purity isoparaffin solvent.

Results: From a consolidated summary of Tables 1–6, it would appear that the addition of the oil-soluble polymer, in this case polyisobutylene in the dosage level of 0.1–0.5% by weight, increased the pourables of the basic water-soluble polymer substantially. In many cases this increase was from a range in the 30's (e.g., 37%) to a range in the 70's (e.g., 75%).

In other experiments in Table 7 a carryover of increase in pourables with Polymer A was observed relating to poly(t)butylstyrene (TBS), a natural rubber latex with 65% solids (NRL), and Betaprene H-100 (Reichhold), which is a hydrocarbon resin derived from a narrow range of monomeric olefins and di-olefins.

TABLE 1

THE STABILIZATION OF INVERTED LATICES BY THE ADDITION OF A SOLUTION OF POLYISOBUTYLENE (OPPANOL B-200) IN ISOPAR M

| Level of PIB Addition (Wt. on Latex) | PIB Source (Conc. in Isopar) | LATEX Polymer B | | | Polymer C | | | Polymer D | | |
|---|---|---|---|---|---|---|---|---|---|---|
| | | Viscosity (CPS) | Percent Pourables | % Solids Original Polymer | Viscosity (CPS) | Percent Pourables | % Solids Original Polymer | Viscosity (CPS) | Percent Pourables | % Solids Original Polymer |
| Blank | | 1100 | 46.3 | 31.0 | 1400 | 70.5 | 34.0 | 738 | 64.9 | 31.5 |
| .1% | 3% | 875 | 64.0 | 30.0 | 975 | 80.9 | 32.9 | 775 | 75.5 | 30.4 |
| .3% | 3% | 800 | 80.7 | 27.9 | 1163 | 90.0 | 30.6 | 888 | 88.2 | 28.3 |
| .5% | 3% | 1075 | 89.6 | 25.8 | 1363 | 91.3 | 28.3 | 1075 | 91.0 | 26.3 |
| .1% | 6% | 1150 | 57.8 | 30.5 | 1238 | 79.0 | 33.4 | 875 | 73.7 | 31.0 |
| .3% | 6% | 1375 | 83.5 | 29.5 | 1525 | 85.5 | 32.3 | 1150 | 85.5 | 29.9 |
| .5% | 6% | 1975 | 86.0 | 28.4 | 1700 | 86.9 | 31.2 | 1500 | 87.3 | 28.9 |

TABLE 2

THE STABILIZATION OF LIQUID POLYMERS A AND B BY THE ADDITION OF A SOLUTION OF POLYISOBUTYLENE (OPPANOL B-200) IN ESPESOL

| Level of PIB Addition (Wt. on Latex) | PIB Source (Soln. conc. in Espesol) | LATEX Polymer A | | | Polymer B | | |
|---|---|---|---|---|---|---|---|
| | | Viscosity (CPS) | Percent Pourables | Percent Original Polymer | Viscosity (CPS) | Percent Pourables | Percent Original Polymer |
| Blank | | 1250 | 28.6 | 31.0 | 1175 | 46.3 | 31.0 |
| .1% | 3% | 988 | 46.9 | 30.0 | 913 | 57.5 | 30.0 |
| .3% | 3% | 938 | 69.1 | 27.9 | 863 | 75.2 | 27.9 |
| .5% | 3% | 988 | 77.1 | 25.8 | 1088 | 85.3 | 25.8 |
| .1% | 6% | 1188 | 43.5 | 30.5 | 1150 | 67.9 | 30.5 |
| .3% | 6% | 1163 | 67.0 | 29.5 | 1200 | 79.9 | 29.5 |
| .5% | 6% | 1563 | 77.8 | 28.4 | 1313 | 83.5 | 28.4 |

TABLE 2—Continued

THE STABILIZATION OF LIQUID POLYMERS A AND B BY THE ADDITION OF
A SOLUTION OF POLYISOBUTYLENE (OPPANOL B-200) IN ESPESOL

| Level of PIB Addition (Wt. on Latex) | PIB Source (Soln. conc. in Espesol) | LATEX Polymer A | | | Polymer B | | |
|---|---|---|---|---|---|---|---|
| | | Viscosity (CPS) | Percent Pourables | Percent Original Polymer | Viscosity (CPS) | Percent Pourables | Percent Original Polymer |

THE STABILIZATION OF LIQUID POLYMERS C AND D BY THE ADDITION OF
A SOLUTION OF POLYISOBUTYLENE (OPPANOL B-200) IN ESPESOL

| Level of PIB Addition (Wt. on Latex) | PIB Source (Soln. conc. in Espesol) | LATEX Polymer C | | | Polymer D | | |
|---|---|---|---|---|---|---|---|
| | | Viscosity (CPS) | Percent Pourables | Percent Original Polymer | Viscosity (CPS) | Percent Pourables | Percent Original Polymer |
| Blank | | 1338 | 72.6 | 34.0 | 763 | 68.8 | 30.7 |
| .1% | 3% | 1088 | 84.7 | 32.9 | 738 | 77.3 | 29.7 |
| .3% | 3% | 1125 | 89.0 | 30.6 | 788 | 85.3 | 27.6 |
| .5% | 3% | 1275 | 90.3 | 28.3 | 825 | 90.0 | 25.6 |
| .1% | 6% | 1300 | 79.3 | 33.4 | 838 | 77.9 | 30.0 |
| .3% | 6% | 1500 | 86.3 | 32.3 | 1088 | 85.7 | 29.2 |
| .5% | 6% | 2300 | 87.1 | 31.2 | 1475 | 88.4 | 28.9 |

TABLE 3

THE STABILIZATION OF THE LIQUID POLYMERS A, C, AND D BY THE ADDITION OF
A SOLUTION OF POLYISOBUTYLENE (OPPANOL B-100) IN ISOPAR M

| Level of PIB Addition (Wt. on Latex) | PIB Source (Wt. % in Isopar) | LATEX Polymer A | | | Polymer C | | | Polymer D | | |
|---|---|---|---|---|---|---|---|---|---|---|
| | | Viscosity (CPS) | Percent Pourables | Percent Original Polymer | Viscosity (CPS) | Percent Pourables | Percent Original Polymer | Viscosity (CPS) | Percent Pourables | Percent Original Polymer |
| Blank | | 1325 | 34.4 | 31.0 | 1388 | 70.7 | 34.0 | 813 | 66.9 | 31.5 |
| .1% | 6% | 1213 | 51.9 | 30.5 | 1400 | 77.3 | 33.4 | 925 | 75.6 | 31.0 |
| .3% | 6% | 1125 | 67.1 | 29.5 | 1550 | 84.0 | 32.3 | 1150 | 81.9 | 29.9 |
| .5% | 6% | 1163 | 75.7 | 28.4 | 1800 | 85.6 | 31.2 | 1300 | 83.6 | 28.9 |

TABLE 4

THE STABILIZATION OF LIQUID POLYMERS A, C, AND D BY THE ADDITION OF
A SOLUTION OF POLYISOBUTYLENE (OPPANOL B-100) IN ESPESOL

| Level of PIB Addition (Wt. on Latex) | PIB Source (Wt.% in Espesol) | LATEX Polymer A | | | Polymer C | | | Polymer D | | |
|---|---|---|---|---|---|---|---|---|---|---|
| | | Viscosity (CPS) | Percent Pourables | Percent Original Polymer | Viscosity (CPS) | Percent Pourables | Percent Original Polymer | Viscosity (CPS) | Percent Pourables | Percent Original Polymer |
| Blank | | 1363 | 31.7 | 31.0 | 1425 | 70.6 | 34.0 | 1325 | 67.6 | 31.5 |
| .1% | 6% | 1225 | 51.5 | 30.5 | 1413 | 78.5 | 33.4 | 913 | 73.2 | 31.0 |
| .3% | 6% | 1180 | 68.0 | 29.5 | 1538 | 84.2 | 32.3 | 1088 | 80.5 | 29.9 |
| .5% | 6% | 1275 | 75.0 | 28.4 | 1875 | 85.9 | 31.2 | 1288 | 85.4 | 28.9 |

TABLE 5

THE STABILIZATION OF THE LIQUID POLYMERS A, C, AND D BY THE ADDITION OF
A SOLUTION OF POLYISOBUTYLENE (OPPANOL B-50) IN ISOPAR M

| Level of PIB Addition (Wt. on Latex) | PIB Source (Wt.% in Isopar M) | LATEX Polymer A | | | Polymer C | | | Polymer D | | |
|---|---|---|---|---|---|---|---|---|---|---|
| | | Viscosity (CPS) | Percent Pourables | Percent Original Polymer | Viscosity (CPS) | Percent Pourables | Percent Original Polymer | Viscosity (CPS) | Percent Pourables | Percent Original Polymer |
| Blank | | 1388 | 38.7 | 31.0 | 1413 | 70.5 | 34.0 | 825 | 64.6 | 31.5 |
| .1% | 6% | 1138 | 47.3 | 30.5 | 1325 | 76.9 | 33.4 | 888 | 72.5 | 30.0 |
| .3% | 6% | 1000 | 58.1 | 29.5 | 1350 | 81.8 | 32.3 | 988 | 76.9 | 29.2 |
| .5% | 6% | 975 | 64.6 | 28.4 | 1475 | 82.0 | 31.2 | 1063 | 82.0 | 28.0 |

TABLE 6

THE STABILIZATION OF LIQUID POLYMERS A, C, AND D BY THE ADDITION OF
A SOLUTION OF POLYISOBUTYLENE (OPPANOL B-50) IN ESPESOL

| Level of PIB Addition (Wt. on Latex) | PIB Source (Soln. in Espesol) | Polymer A | | | LATEX Polymer C | | | Polymer D | | |
|---|---|---|---|---|---|---|---|---|---|---|
| | | Viscosity (CPS) | Percent Pourables | Percent Original Polymer | Viscosity (CPS) | Percent Pourables | Percent Original Polymer | Viscosity (CPS) | Percent Pourables | Percent Original Polymer |
| Blank | | 1350 | 36.1 | 31.0 | 1400 | 70.2 | 34.0 | 813 | 63.9 | 31.5 |
| .1% | 6% | 1150 | 41.9 | 30.5 | 1350 | 74.2 | 33.4 | 875 | 69.4 | 31.0 |
| .3% | 6% | 1013 | 55.0 | 29.5 | 1438 | 79.2 | 32.3 | 975 | 76.0 | 29.9 |
| .5% | 6% | 988 | 58.3 | 28.4 | 1575 | 82.0 | 31.2 | 1063 | 79.0 | 28.9 |

TABLE 7

| Additive (Wt. on Polymer) | Wt % on Latex (Liquid Polymer) | Viscosity Before Additive (3 12 rpm) | Viscosity After Additive (3 12 rpm) | Wt. to Flow After 10 min. Centrifugation (50g Sample) | % to Flow | Consistency of Residue |
|---|---|---|---|---|---|---|
| 0.00% TBS | .00 | 2800 cps | — | 18.7g | 37.4% | Thick |
| 0.25% TBS | .08 | " | 2800 cps | 25.1g | 50.0% | " |
| 0.50% TBS | .16 | " | 3250 cps | 30.1g | 60.6% | Flows |
| 0.75% TBS | .24 | " | 3700 cps | 34.6g | 69.2% | " |
| 1.00% TBS | .32 | " | 4060 cps | 37.2g | 74.5% | " |
| 1.50% TBS | .48 | " | 4350 cps | 35.5g | 71.0% | " |
| 0.25% NRL | .08 | " | 3720 cps | 25.5g | 51.0% | Thick |
| 0.50% NRL | .16 | " | 4350 cps | 26.9g | 54.0% | Flows |
| 0.75% NRL | .24 | " | 5360 cps | 29.6g | 59.0% | " |
| 1.00% NRL | .32 | " | 6600 cps | 30.7g | 61.4% | " |
| 1.50% NRL | .48 | " | 9500 cps | 22.4g | 44.7% | " |
| 0.25% H-100 | .08 | " | 2800 cps | 18.9g | 37.8% | V. Thick |
| 0.75% H-100 | .24 | " | 2680 cps | 21.7g | 43.4% | " |
| 1.00% H-100 | .32 | " | 2500 cps | 21.8g | 43.5% | " |

TBS = poly(tertiary)butylstyrene
NRL = natural rubber latex with 65% solids
H-100 = Betaprene H-100 (Reichhold), a polymer of m.p. 100°C. (Ball & Ring) derived from a narrow hydrocarbon cut consisting principally of a mixture of mono- and di-olefin monomers

EXAMPLE 2

Drum Test

Two drums of Polymer A were blended and mixed. Both drums were then refilled with the homogenous product and to one of them was added 1% polyisobutylene. Using the same material, two 100 cc glass tubes were used as a double monitor.

Inspection of both drums after 45 days indicated that the amount of settled solids in the untreated drum was considerably higher (about 9 inches) than in the treated sample (less than one-fourth inch).

Using light duty air driven mixers both drums were mixed and viscosities were measured as a function of time. Brookfield viscosities of the untreated Polymer A was 2,150 cps compared to 1,150 cps for the treated sample. It was possible to reconstitute the treated Polymer A to its original viscosity of 1,150 cps in less than 10 minutes. It was not possible to measure the viscosity of the untreated sample because of the large lumps and consequent uneven distribution of the product. Both drums were mixed for a total of 2 hours; no improvement was observed in the untreated sample.

Similar results were observed in the double monitor 100 cc tubes.

Polymer A, as noted ante in Example 1, is a homopolymer of sodium acrylate with a molecular weight of about 2 million.

We claim:

1. In a method of stabilizing and decreasing sediment formation in a water-in-oil emulsion wherein the water phase contains a water-soluble vinyl addition polymer in a continuous oil phase, the step consisting of adding an oil-soluble polymer to the continuous phase in an amount of about 0.1–1% based on the total weight of the emulsion wherein the oil-soluble polymer selected from at least one member of the group consisting of polyisobutylene, polybutadiene, poly(tertiary) butystyrene and natural rubber, and wherein said oil-soluble polymer has a molecular weight in the range of about 300,000 to 6 million dispersed in a suitable organic solvent.

2. A water-in-oil emulsion of a water-soluble vinyl addition polymer which also contains as an additive about 0.1–1% by weight of an oil-soluble polymer added to the continuous phase wherein the weight percent of said oil-soluble polymer is based on the total emulsion and wherein the oil-soluble polymer selected from at least one member of the group consisting of polyisobutylene, polybutadiene, poly(tertiary) butylstyrene and natural rubber, and wherein said oil-soluble polymer has a molecular weight in the range of about 300,000 to 6 million dispersed in a suitable organic solvent.

* * * * *